United States Patent
Kanemaru

(10) Patent No.: US 10,691,106 B2
(45) Date of Patent: Jun. 23, 2020

(54) NUMERICAL CONTROLLER

(71) Applicant: FANUC CORPORATION, Minamitsuru-gun, Yamanashi (JP)

(72) Inventor: Akira Kanemaru, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 205 days.

(21) Appl. No.: 15/427,606

(22) Filed: Feb. 8, 2017

(65) Prior Publication Data

US 2017/0235299 A1   Aug. 17, 2017

(30) Foreign Application Priority Data

Feb. 12, 2016   (JP) ................... 2016-024674

(51) Int. Cl.
*G05B 19/4155*   (2006.01)
*G05B 19/406*   (2006.01)

(52) U.S. Cl.
CPC ....... *G05B 19/4155* (2013.01); *G05B 19/406* (2013.01); *G05B 2219/35291* (2013.01);
(Continued)

(58) Field of Classification Search
USPC ........................................................ 700/174
See application file for complete search history.

(56) References Cited

U.S. PATENT DOCUMENTS 6,751,575 B2 *   6/2004   Lenz ................... G05B 9/02
                                                       700/51
9,176,171 B2 *   11/2015   Bickel ................. H02J 13/0006
(Continued)

FOREIGN PATENT DOCUMENTS

CN   103403692 A   11/2013
CN   103914033 A   7/2014
(Continued)

OTHER PUBLICATIONS

Decision to Grant a Patent for Japanese Application No. 2016-024674, dated Jun. 5, 2018, with English translation, 6 pages.
(Continued)

*Primary Examiner* — Mohammad Ali
*Assistant Examiner* — Joshua T Sanders
(74) *Attorney, Agent, or Firm* — RatnerPrestia

(57) ABSTRACT

The present invention relates to numerical controller having a function for collecting the data regarding machining without using external devices such as data logger and outputting the data in batch.

The numerical controller comprises collection/output control unit configured to provide an interface for setting the collection information defining collection condition of the numerical control data and the peripheral equipment data and aggregation information defining the aggregation condition upon aggregating the and the peripheral equipment data and an interface for outputting the produced process data; data management unit configured to collect the numerical control data in accordance with the collection information; data collection unit configured to collect the peripheral equipment data from the peripheral equipment in accordance with the collection information; and data aggregation unit configured to produce the process data obtained by aggregating the numerical control data and peripheral equipment data in accordance with the aggregation information.

4 Claims, 8 Drawing Sheets

(52) U.S. Cl.
  CPC .............. *G05B 2219/36023* (2013.01); *G05B 2219/37574* (2013.01)

(56) References Cited

U.S. PATENT DOCUMENTS

| | | |
|---|---|---|
| 2008/0288775 A1* | 11/2008 | Baier ................. G05B 19/4183 713/157 |
| 2013/0318260 A1 | 11/2013 | Watabe |
| 2014/0195015 A1 | 7/2014 | Faist et al. |
| 2015/0066434 A1 | 3/2015 | Ogawa |
| 2016/0291576 A1 | 10/2016 | Nakamura |
| 2017/0168993 A1* | 6/2017 | Prakash ................. H04L 67/10 |

FOREIGN PATENT DOCUMENTS

| | | |
|---|---|---|
| CN | 104102682 A | 10/2014 |
| JP | 2000039910 A | 2/2000 |
| JP | 2004-178479 A | 6/2004 |
| JP | 2008102865 A | 5/2008 |
| JP | 2011138463 A | 7/2011 |
| JP | 2015052846 A | 3/2015 |
| WO | 2015092853 A1 | 6/2015 |

OTHER PUBLICATIONS

Chinese Office Action for Chinese Application No. 201710077723.5, dated Jan. 30, 2019, with translation, 12 pages.

\* cited by examiner

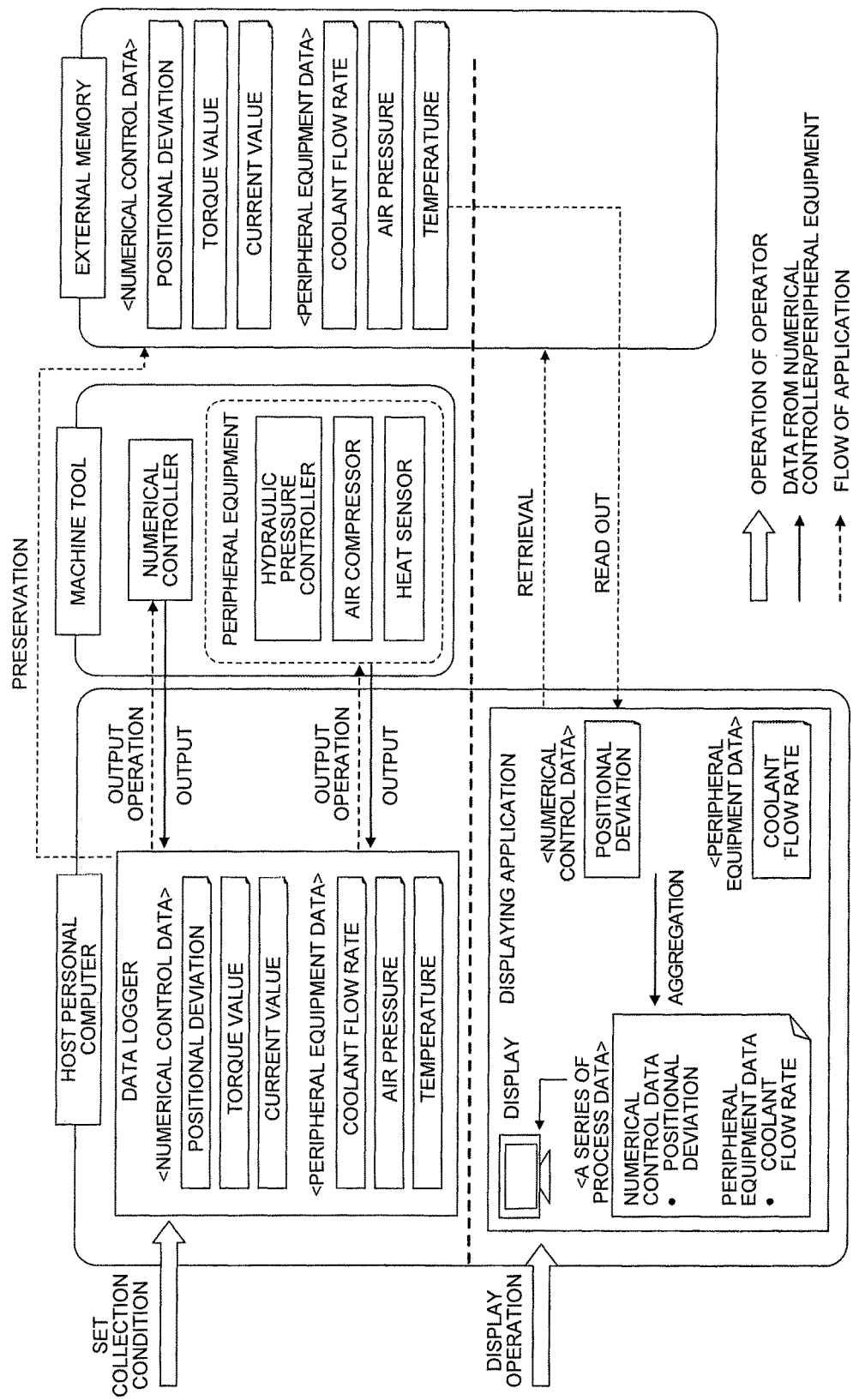

NUMERICAL CONTROLLER

BACKGROUND OF THE INVENTION

1. Field of the Invention

The present invention relates to numerical controller, in particular to the numerical controller having a function to batch output data regarding numerical control or those regarding peripheral equipment.

2. Description of the Related Art

In recent years, in order to attain the object for improving the quality of machining, reducing time required for machining, and investigating the causes of the defective processing, numerical control data produced or detected upon machining under the control of the machine and peripheral equipment data taken from peripheral equipment used for the machining are collected, and thus obtained data are analyzed and put them into practical use. In order to analyze the situation of the machining more precisely and to use the process data efficiently, not only the control data of the numerical controller but also the data of the peripheral equipment are collected in many cases.

FIG. 7 is a schematic diagram illustrating the method of the prior art for collecting data regarding machining. As can be seen from FIG. 7, the numerical controller is adapted to be set by the operator on the kind of numerical control data to be output as well as the destination of the output. With respect to the peripheral equipment, the data output operation is effected on each equipment in substantially the same manner as mentioned above. It is thus necessary in the prior art for the operator to control the numerical controller and the peripheral equipment independently for collecting the process data.

The respective data output from the peripheral equipment to the external memories include time stamps on the basis of the watch of each equipment. These data are not unified in their unit and sampling cycle. It is thus difficult to compare and analyze the relative operation between equipment immediately. It is necessary for the operator to settle the differences between equipment, adjust the time series between data, and aggregate them to a series of comparable and analyzable process data.

As the other prior art technology, a system automated in the collection and the usage of data as shown in FIG. 8 is used frequently. In this system, data logger or application such as displaying application operated on personal computers are employed by connecting the host personal computer to the numerical controller, or by means of the numerical controller with the function of the personal computer.

For example, in JP 2004-178479 A, disclosed is a data collection device for accumulating data acquired from the data generator as real-time data corresponding to the real time on which the data are acquired, wherein compensated data accumulating unit for accumulating the acquiring time of the data as those compensated for expected time period is provided. By adopting such arrangement, output operation by the operator and aggregation operation can be automated.

However, there is a problem that the cost for developing or purchasing the data logger (data collection device) or the displaying application, and the cost for the architecture and the operation of the system circumstances on which the data logger or the displaying application runs is burden. Further, it is necessary to provide an interface for exchanging huge amount of process data between the data logger for collecting process data and the application using the collected process data. It is also the problem that the high performance interface is to be provided to enable the exchanging of the huge amount of process data.

SUMMARY OF THE INVENTION

The object of the present invention is to provide numerical controller having a function to collect process data without use of external devices such as data logger, and to batch output of the data.

In accordance with the present invention, provided is a numerical controller for collecting numerical control data produced or detected upon machining under the control of the machine and peripheral equipment data taken from peripheral equipment used for machining, producing process data obtained by aggregating the numerical control data and the peripheral equipment data, and outputting the process data comprising:

collection/output control unit configured to provide an interface for setting the collection information defining collection condition of the numerical control data and the peripheral equipment data and aggregation information defining the aggregation condition upon aggregating the and the peripheral equipment data and an interface for outputting the produced process data;

data management unit configured to collect the numerical control data in accordance with the collection information;

data collection unit configured to collect the peripheral equipment data from the peripheral equipment in accordance with the collection information; and data aggregation unit configured to produce the process data obtained by aggregating the numerical control data and peripheral equipment data in accordance with the aggregation information.

In accordance with another aspect of the present invention, provided is the numerical controller wherein the collection information comprising any one of the kind of the collected data, the time required for collecting the data, the number of collected data, and peripheral equipment identifying information.

In accordance with the other aspect of the present invention, provided is the numerical controller wherein the aggregation information comprising any one of reference data on which the data are aggregated, conversion factor of the numerical control data and the peripheral equipment data, and time shift of the numerical control data and the peripheral equipment data.

In accordance with the further aspect of the present invention, provided is the numerical controller wherein the data collection unit is adapted to output the lag time of the command exchanged with the peripheral equipment together with the peripheral equipment data, and the data aggregation unit is adapted to shift the peripheral equipment data in time axis direction on the basis of the lag time upon aggregation of data.

In accordance with the present invention, the collection of process data can easily be made since it is not required for the operator to control the numerical controller and the peripheral equipment respectively. The aggregation of process data is also unnecessary since a series of process data output from the numerical controller had already been adjusted in their time stamps.

With respect to the peripheral equipment having no data input/output interfaces for personal computers, data can be collected through I/O device connected to the numerical controller. Thus data can be collected from a variety of many peripheral equipment. Further, it is not necessary to provide dedicated data logger, can be reduced the cost for developing or purchasing the data logger or the displaying application, and the cost for the architecture and the operation of the system circumstances on which the data logger or the displaying application runs. The process data can immediately be confirmed on the numerical controller since the time for transferring data and the time for responding to the application are not needed.

BRIEF DESCRIPTION OF THE DRAWINGS

The above-described and other objects and characteristics of the present invention will be apparent from the following description of embodiments with reference to the accompanying drawings, wherein:

FIG. 8 is a schematic diagram illustrating the method of the prior art for collecting data regarding machining with personal computer.

DETAILED DESCRIPTION OF THE PREFERRED EMBODIMENTS

A preferred embodiment of the present invention will now be described with reference to the attached drawings.

Figure 1:
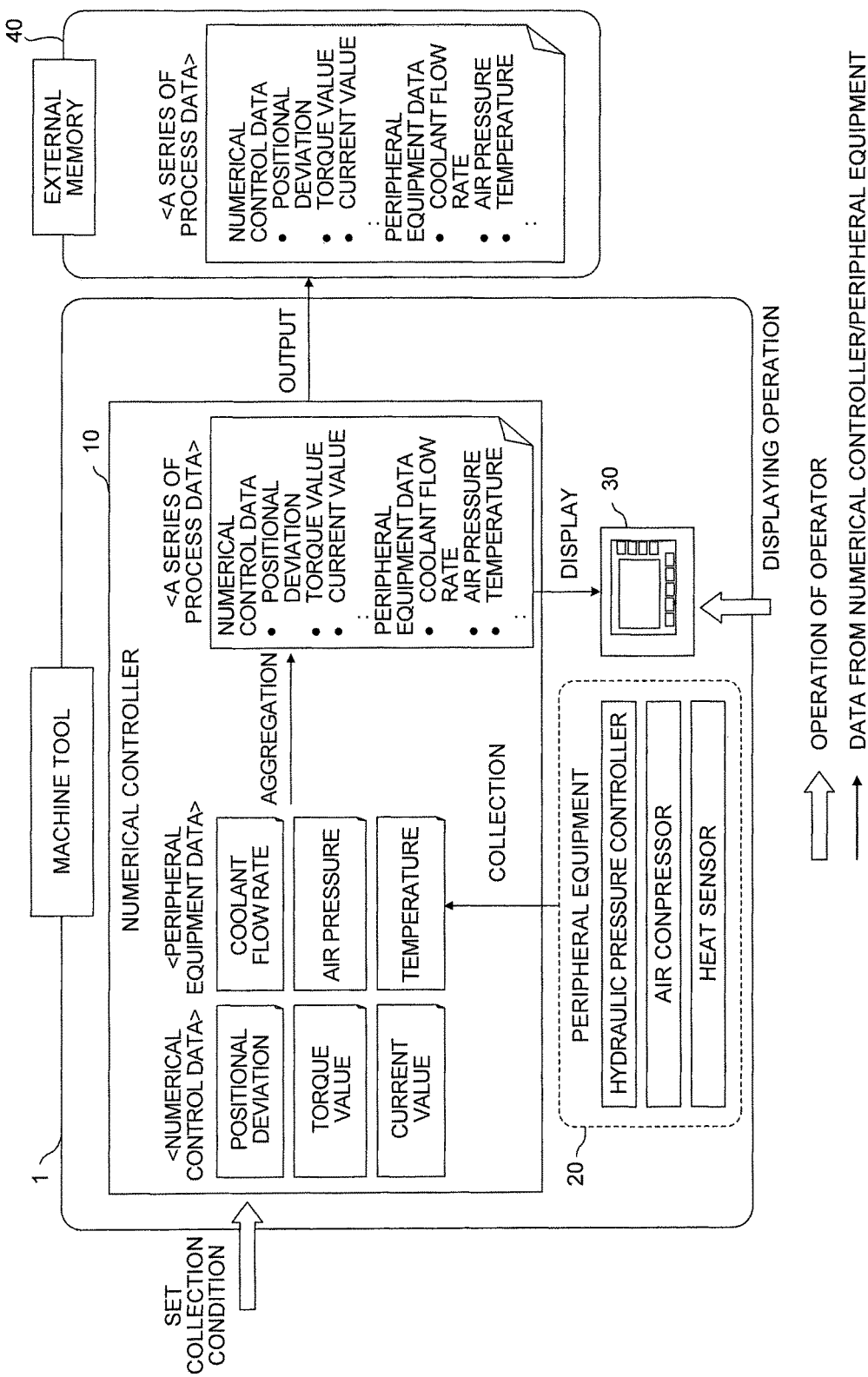
FIG. 1 is schematic diagram illustrating the functions of the numerical controller of the present invention.

FIG. 1 is a schematic diagram illustrating the functions of the numerical controller of the present invention. The numerical controller 10 has a function for collecting peripheral equipment data automatically from peripheral equipment 20 in accordance with the setting defined by the operator, aggregating a series of process data unified in the time stamps and/or sampling cycle between numerical control data and the peripheral equipment data, and displaying them on the screen of display device 30 or outputting them to external memory 40. The process data can be used efficiently and with low cost by means of the numerical controller 10 of the present invention without employing data loggers or applications for personal computer such as displaying applications, since the number of manual operation of the operator can be reduced and the collection and aggregation of the process data can be effected sequentially.

Figure 2:
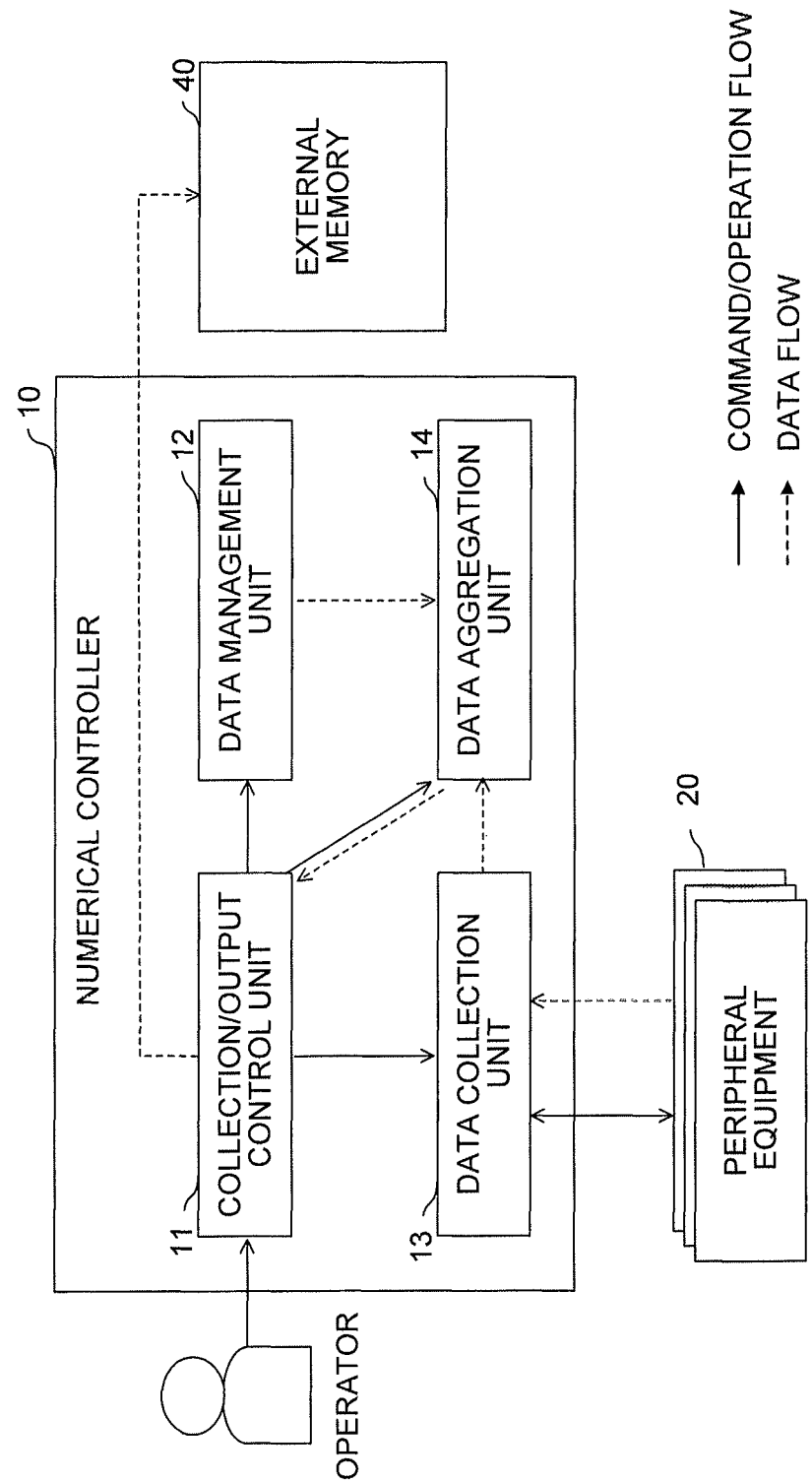
FIG. 2 is a schematic functional block diagram of the numerical controller of an embodiment of the present invention.
Figure 3:
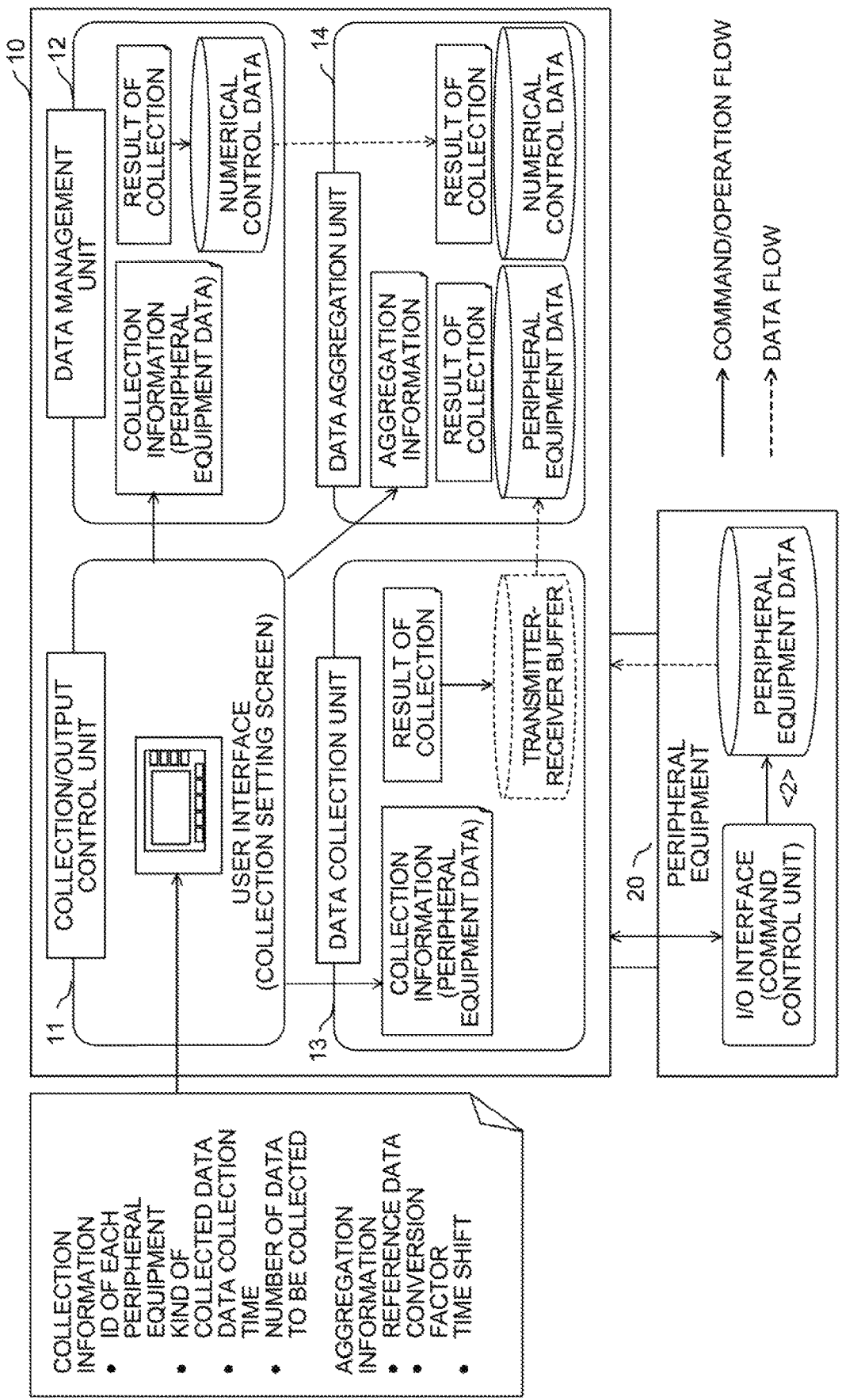
FIG. 3 is a schematic functional block diagram illustrating data to be exchanged between the functional means of the numerical controller as illustrated in FIG. 2.

FIG. 2 is a schematic functional block diagram illustrating command/operation flow and data flow effected in the numerical controller 10 of an embodiment of the present invention. FIG. 3 is a schematic functional block diagram illustrating in more detail the data to be exchanged between the functional means as illustrated in FIG. 2. The numerical controller 10 of this embodiment includes collection/output control unit 11, data management unit 12, data collection unit 13, and data aggregation unit 14.

The collection/output control unit 11 is a functional means providing an interface for setting the collection information for setting the collection condition such as a subject from which data are to be collected and the period for collecting data, and an aggregation information setting the aggregation condition on how the data obtained by collecting on the basis of the collection information are aggregated, and an interface for outputting to the operator the process data aggregated by the data aggregation unit 14. The collection/output control unit 11 is adapted to notify the collection information regarding the numerical control data set by the operator through the interface for setting the collection information and aggregated information into the data management unit 12, the collection information regarding the peripheral equipment data to the data collection unit 13, and the aggregation information set by the operator to the data aggregation unit 14 respectively.

In the collection information to be set by means of the collection/output control unit 11, kinds of numerical control data to be collected, data collection period designating the period for collecting data, and number of data to be collected are to be set as numerical control data, and ID of the peripheral equipment 20 from which data are to be collected, kinds of peripheral equipment data to be collected, data collection period designating the period for collecting data, and number of data to be collected are to be set as peripheral equipment data. With respect to the peripheral equipment data, the sampling period in accordance with which the collection of data can be effected sometimes depend on each peripheral equipment 20. In such a case, such item can be input through the selection by the operator of the value set by using the peripheral equipment 20. In the peripheral equipment 20 to be selected as the object to be collected, sensors such as acceleration sensor or shock sensor, and equipment to be used in association with machining such as those linked with each other including chip conveyors or robots.

The aggregation information to be set on the data aggregation unit 14 through the collection/output control unit 11 includes the reference data which is the reference of the aggregation within the data designated as the object to be collected in the collection information set by the operator, conversion factor for the unit conversion upon aggregation of data designated as the object to be collected, and time shift designating the amount of time shift upon aggregation of each data designated as the object to be collected. The time shift is a delay time or a lag time to the commencement of data transfer of the peripheral equipment 20. Since the peripheral equipment 20 necessitates a predetermined processing time from receiving data output request to the real commencement of the output of the data, the requested data is apt to be output with any delay (the lug time occurred on the output of <2> in FIG. 3). It is necessary to set the lag time searched preliminary on each peripheral equipment 20 by the operator, since the lag time depend on each peripheral equipment 20.

The data management unit 12 is adapted to manage the numerical control data such as those used for the numerical control of the machining tool 1 or those to be obtained as a result of the numerical control of the machining tool 1. The unit 12 is adapted to transfer the numerical control data managed thereby to the data aggregation unit 14 in accordance with the collection information notified from the collection/output control unit 11.

The data collection unit 13 includes an interface with the peripheral equipment 20, and is adapted to command communication therewith in accordance with the collection information notified from the collection/output control unit 11, store the peripheral equipment data from the peripheral equipment 20 in the transmitter-receiver buffer, aggregate the stored peripheral equipment data, and transfer the data to the data aggregation unit 14.

The numerical controller 10 is connected to the peripheral equipment 20 through the network or I/O device so that a system which is able to transmit and/or receive the command and data is provided. The command is not only the universal communication command but also the control signal recognizable between the conventional numerical controller 10 and the peripheral equipment 20. The lag time inevitable in the transmission of command (the lug time occurred on the signal exchange of <1> in FIG. 3) is measured preliminary to add it to the results to be obtained from the collection.

The data aggregation unit 14 is adapted to produce the process data obtained by aggregating the numerical control data transferred from the data management unit 12 and the peripheral equipment data transferred from the data collection unit 13 in accordance with the aggregation information notified from the collection/output control unit 11.

Figure 4:
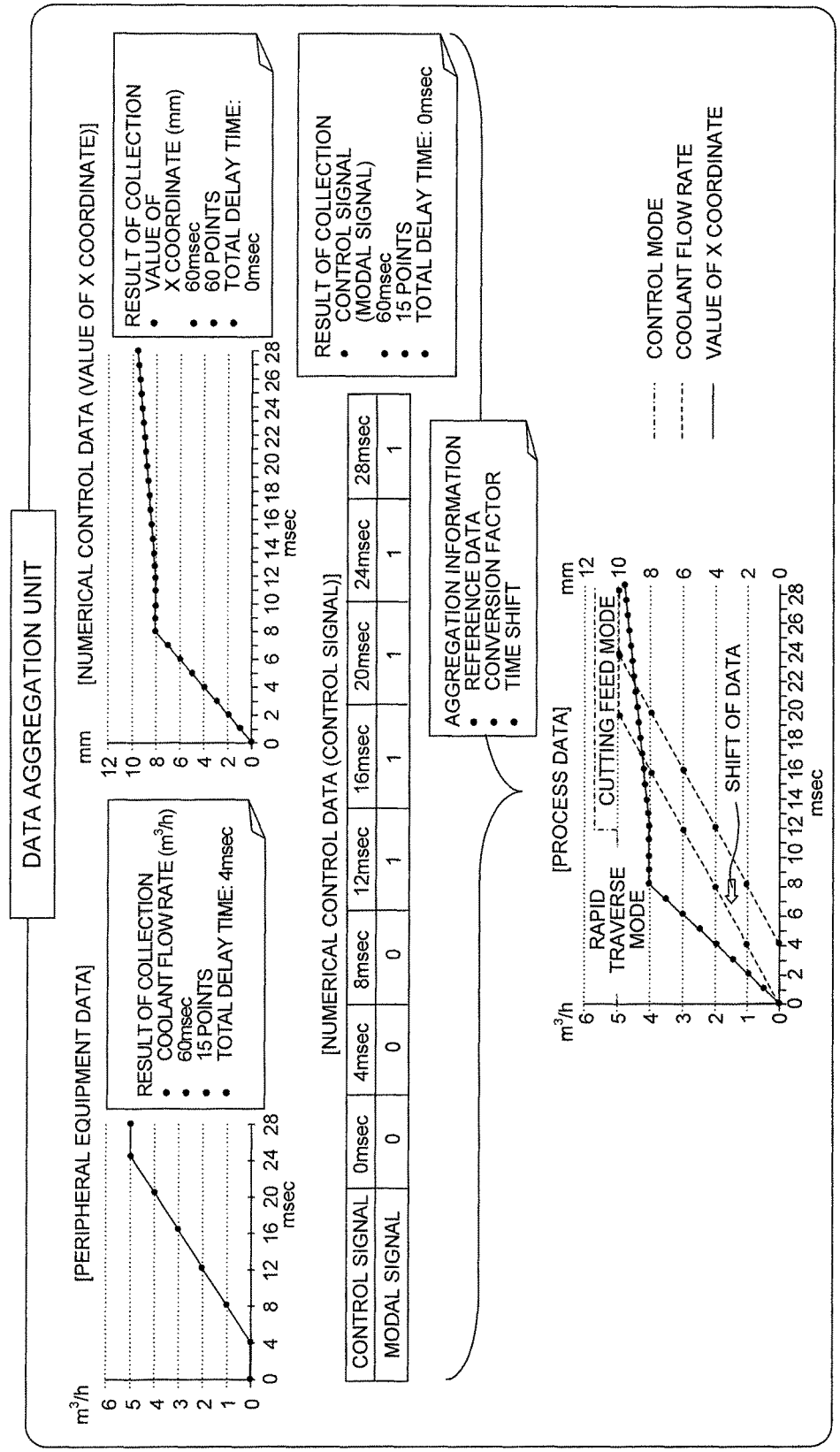
FIG. 4 is a diagram showing an example of the method for aggregating data by means of the data aggregation unit.

An example of the method for aggregating the data by means of the data aggregation unit 14 is shown in FIG. 4. In the example illustrated in FIG. 4, the flow rate of coolant as the peripheral equipment data, the value of X coordinate as the numerical control data, and control signal (modal signal) are collected, and the collected data are aggregated in accordance with the following data aggregating sequence.

<1. Classification of Data>

The collected numerical control data and peripheral equipment data are classified to those of minor time-series variation such as optional data, the parametric data, and the amounts of compensation (data regarding the structure of the hardware), and those of major time-series variation such as the coolant flow rate, the coordinate value, and the control signal.

<2. Unit Conversion of Data>

Unit conversion processes on the numerical control data and peripheral equipment data are effected on the basis of the conversion factor notified from the collection/output control unit 11 as aggregation information or conversion factor registered preliminary on each data.

<3. Adjustment of the Data Collection Time>

The data notified from the collection/output control unit 11 as aggregation information is defined as the reference data. Provided the reference data is not designated in the aggregation information the numerical control data necessitating the longest data collection time or peripheral equipment data is defined as the reference data. The collected data are deployed along the time axis of the reference data.

<4. Calculation of the Sampling Cycle>

The sampling cycle of each of the numerical control data and the peripheral equipment data may be found from data collection time and the number of collected data.

<5. Interpolation of Data>

The numerical control data and the peripheral equipment data other than the reference data are interpolated to the sampling cycle of the reference data.

<6. Shift of Data>

The time shift included in the aggregation information and the lag time included in the result of collection are added up to shift the numerical control data and the peripheral equipment data on the time axis of the reference data respectively.

Figure 5:
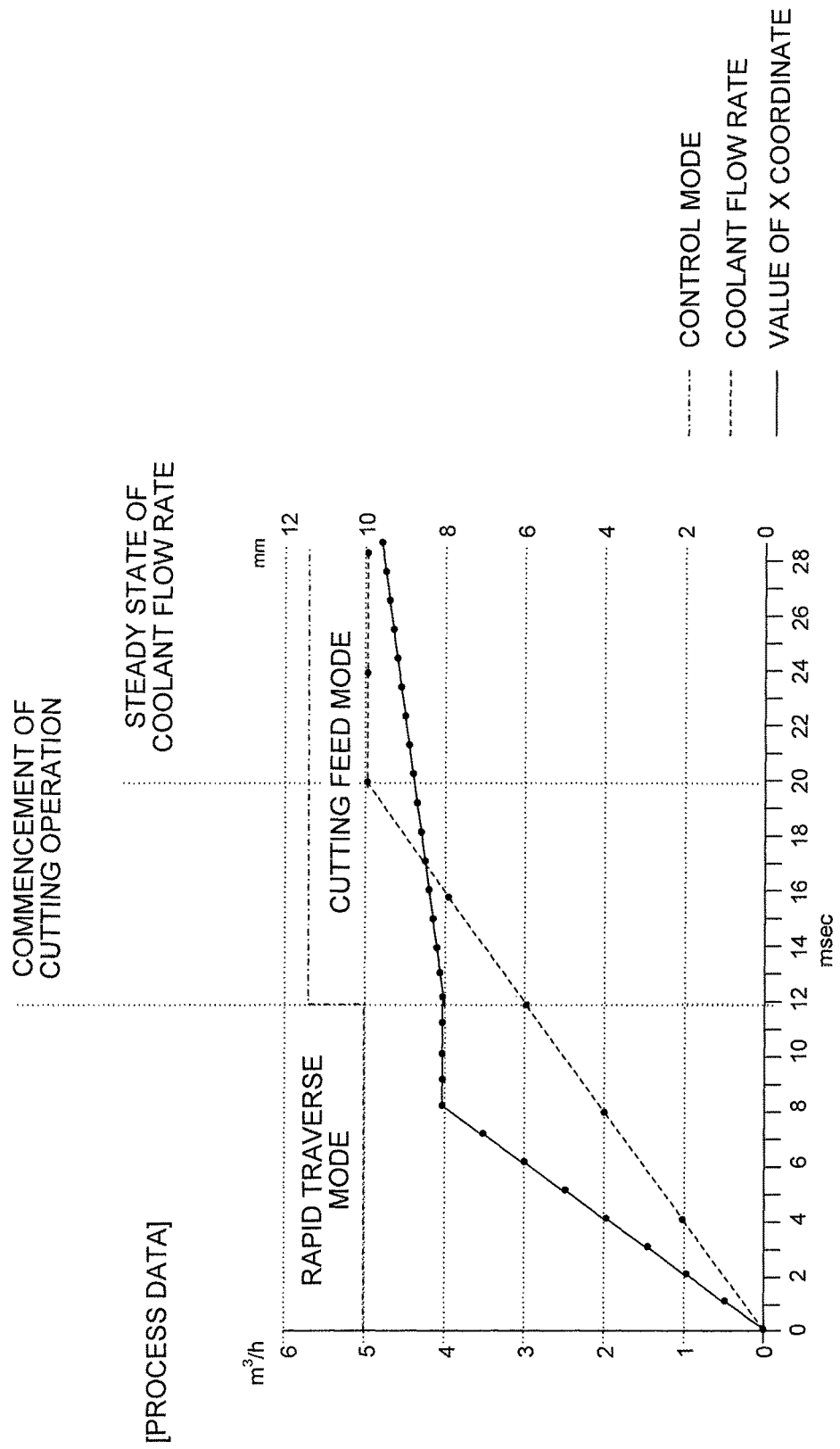
FIG. 5 is a diagram showing an example of the process data aggregated by means of the data aggregation unit.

An example of the process data aggregated in accordance with the above mentioned data processing sequence is shown in FIG. 5.

The operator can grasp the fact that the cutting operation had commenced before the flow rate of the coolant reached the steady state value at first glance of FIG. 5, and the programs employed in machining and the setting of each peripheral equipment can be reconfirmed in accordance with the grasped information.

Figure 6:
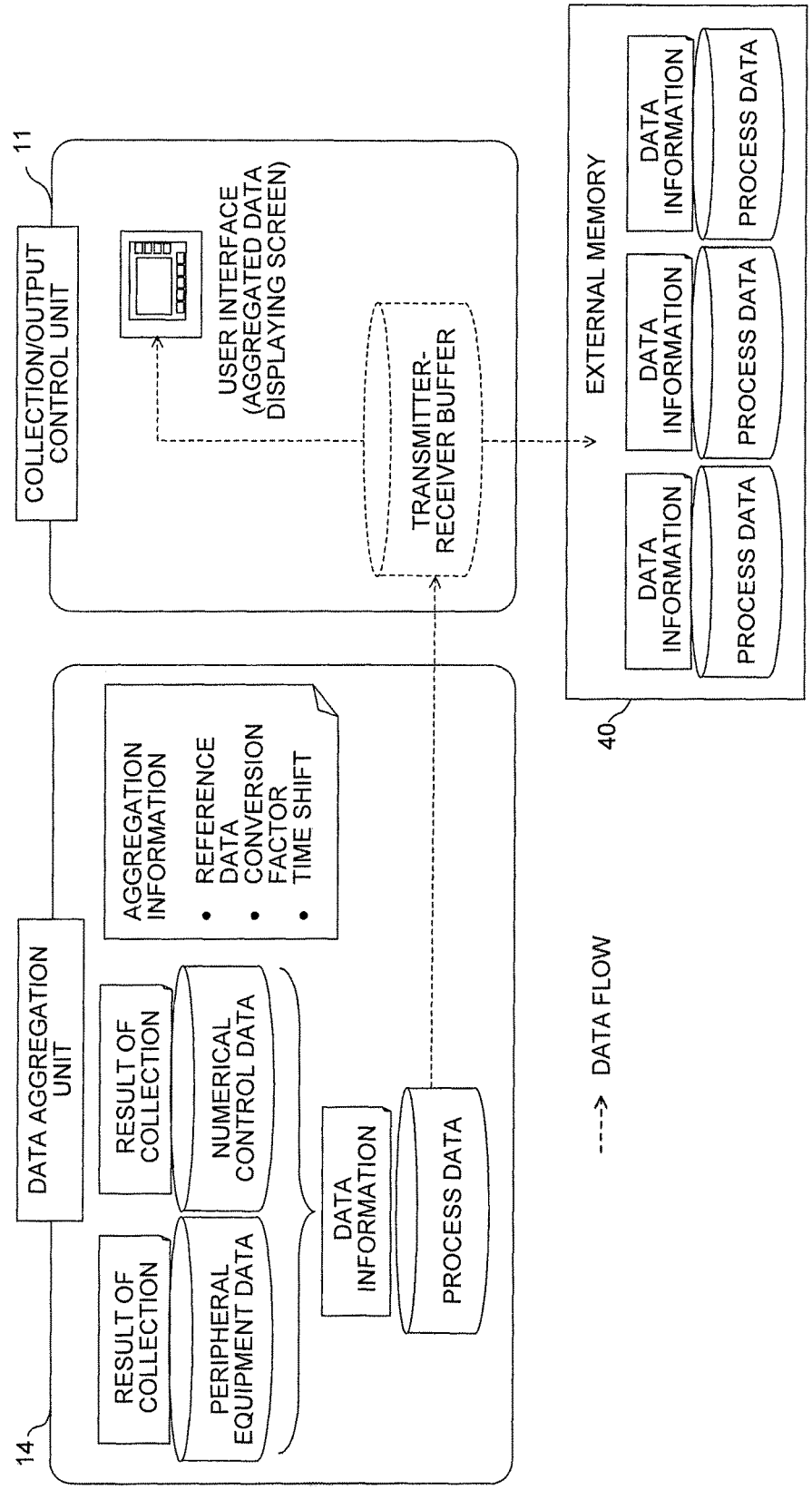
FIG. 6 is a schematic diagram for explaining the flow of the process for outputting the data aggregated by the data aggregation unit through the collection/output control unit to the operator.
Figure 7:
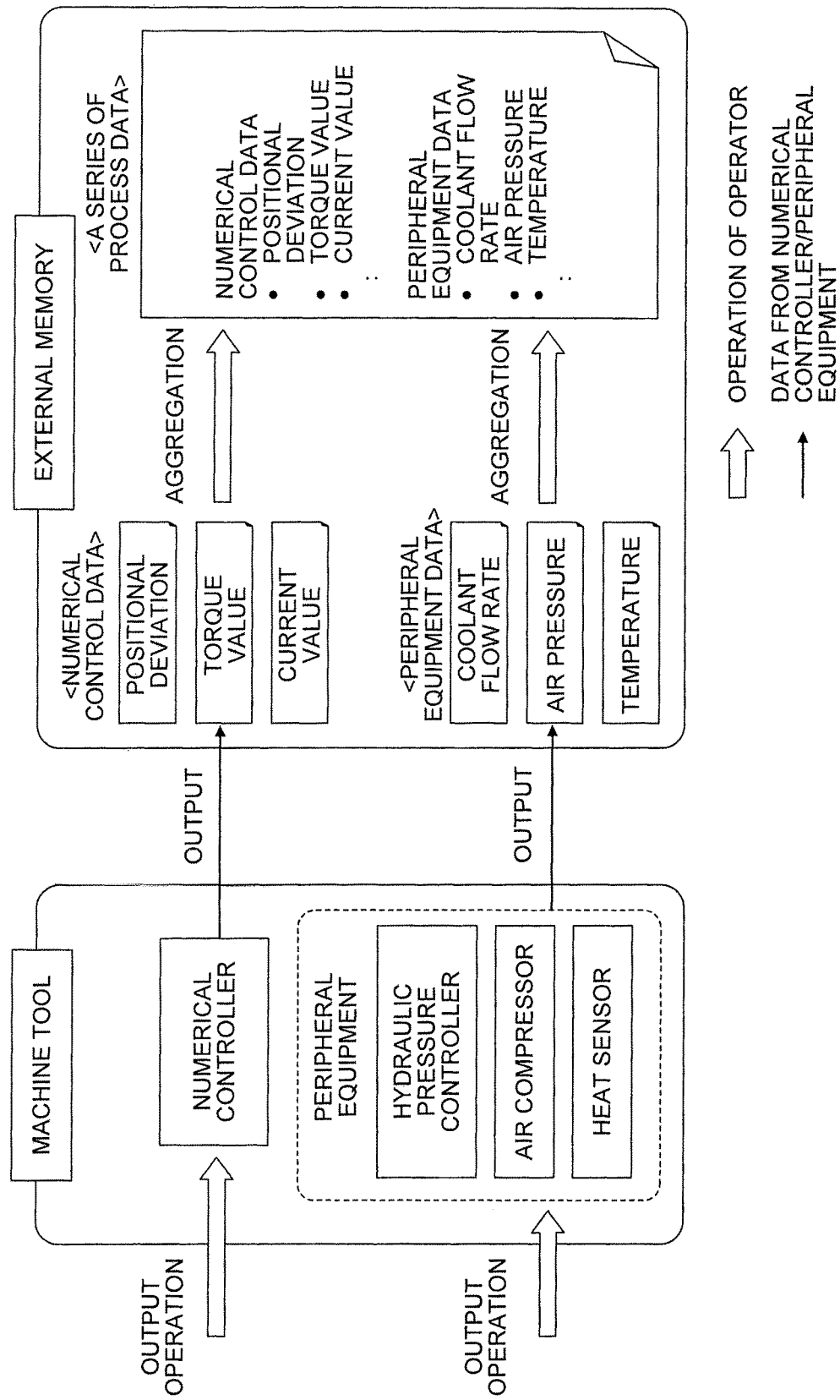
FIG. 7 is a schematic diagram illustrating the method of the prior art for collecting data regarding machining.

FIG. 6 is a schematic diagram for explaining the flow of the process for outputting the data aggregated by the data aggregation unit 14 through the collection/output control unit 11 to the operator. The data aggregation unit 14 is adapted to transfer the aggregated process data to the collection/output control unit 11. The collection/output control unit 11 is adapted to output the process data to the operator or to transfer the process data to the external memory 40 to record them by renewing the displaying interface to display the process data through the transmitter-receiver buffer.

In the numerical controller 10 of the above mentioned arrangement, the collection of the process data can easily be effected, since independent control of the output of the numerical controller 10 and the peripheral equipment 20 are unnecessary. Further, aggregation of the process data by the operator is also unnecessary since a series of data output from the numerical controller 10 had already been adjusted in the time stamps et al therebetween.

The numerical controller 10 can also exchange data with the peripheral equipment 20 such as personal computer with no interface for the input/output of data with the data collection device. The numerical controller 10 can make collection of data through the network or I/O device connected to such peripheral equipment 20, and it can collect data from many peripheral equipment more than the generic data collection device. Further, can be reduced the cost for developing or purchasing the data logger or the displaying application, and the cost for the architecture and the operation of the system circumstances on which the data logger or the displaying application runs. The process data can immediately be confirmed on the numerical controller 10 since the time for transferring data and the time for responding to the application are not needed.

While this invention has been described in terms of the preferred embodiments thereof, it is not intended to be so limited, but rather only to the extent set forth in the claims that follow.

The invention claimed is:

1. A numerical controller comprising:
 a processor configured to:
  collect numerical control data produced or detected upon machining under the control of the machine and peripheral equipment data taken from peripheral equipment used for machining,
  provide an interface for setting collection information defining a collection condition of the numerical control data and the peripheral equipment data, wherein the collection condition defines specific data to be collected,
  collect, via the interface, the numerical control data and the peripheral equipment data in accordance with the collection condition defined in the collection information, set an aggregation information defining an aggregation condition based upon the collected data of the numerical control data and of the peripheral equipment data, wherein the aggregation condition defines how the data collected based on the collection condition is aggregated;

produce process data obtained by aggregating the collected numerical control data and peripheral equipment data in accordance with the aggregation condition defined in the aggregation information;

output the produced process data; and control a machine tool of the machine utilizing the produced process data, wherein the aggregation information comprises time shift of the numerical control data and the peripheral equipment data.

2. The numerical controller as claimed in claim 1 wherein the collection information comprising any one of the kind of the collected data, the time required for collecting the data, the number of collected data, and peripheral equipment identifying information.

3. The numerical controller as claimed in claim 1, wherein the aggregation information further comprises any one of reference data on which the data are aggregated, and conversion factor of the numerical control data and the peripheral equipment data.

4. A numerical controller comprising:

a processor configured to:

collect numerical control data produced or detected upon machining under the control of the machine and peripheral equipment data taken from peripheral equipment used for machining, provide an interface for setting collection information defining a collection condition of the numerical control data and the peripheral equipment data, collect, via the interface, the numerical control data and the peripheral equipment data in accordance with the collection condition defined in the collection information, set an aggregation information defining an aggregation condition upon collecting of the numerical control data and of the peripheral equipment data, produce process data obtained by aggregating the collected numerical control data and peripheral equipment data in accordance with the aggregation condition defined in the aggregation information;

output the produced process data;

control a machine tool of the machine utilizing the produced process data;

output the lag time of the command exchanged with the peripheral equipment together with the peripheral equipment data, and shift the peripheral equipment data in time axis direction on the basis of the lag time upon aggregation of data.

* * * * *